United States Patent [19]

Wiewiorowski et al.

[11] 3,961,030
[45] June 1, 1976

[54] PRODUCTION OF ALUMINA FROM ORES

[75] Inventors: Tadeusz K. Wiewiorowski, New Orleans; David J. Miller, Gretna, both of La.

[73] Assignee: Freeport Minerals Company, New York, N.Y.

[22] Filed: Aug. 12, 1974

[21] Appl. No.: 496,577

[52] U.S. Cl. .............................. 423/126; 23/305 A; 423/132; 423/483; 423/489
[51] Int. Cl.² .......................................... C01F 7/22
[58] Field of Search ............ 423/126, 132, 489, 483

[56] References Cited
UNITED STATES PATENTS

| | | | |
|---|---|---|---|
| 508,796 | 11/1923 | Ackermann | 423/126 |
| 1,036,453 | 8/1912 | Childs | 423/132 |
| 1,237,488 | 8/1917 | Doremus | 423/126 |
| 1,391,172 | 9/1921 | Doremus | 423/132 |
| 1,403,183 | 1/1922 | Milligem | 423/126 |
| 2,842,428 | 7/1958 | Glocker | 423/126 |
| 2,920,938 | 1/1960 | Matoush | 423/126 |
| 2,958,575 | 11/1960 | Allen | 423/489 |
| 3,057,681 | 10/1962 | Gernes et al. | 423/489 |

Primary Examiner—Herbert T. Carter
Attorney, Agent, or Firm—Ronald A. Schapira

[57] ABSTRACT

An aluminum-containing ore such as a kaolin or montmorillonite clay is treated with a fluorine acid such as HF or $H_2SiF_6$ to produce aluminum fluoride ($AlF_3$) which is recovered from the liquid phase of the reaction mixture by crystallization as $AlF_3 \cdot 3H_2O$ crystals which are then dried and dehydrated to yield $AlF_3$. The crystallization mother liquor is recycled to the process to recover its $AlF_3$ values. The $AlF_3 \cdot 3H_2O$ crystals and separated solid phase of the reaction mixture are washed to recover $AlF_3$ values and the wash streams are recycled to the process. To produce alumina, the $AlF_3$ is pyrohydrolyzed to $Al_2O_3$ and HF. The HF is absorbed in the crystallization mother liquor and recycled with the mother liquor to the ore treatment step. All or a part of fluorine acid requirements can also be supplied from any suitable source such as, for example, a wet process phosphoric acid facility which is a plentiful source of inexpensive fluorine. The fluorine acid requirements can be supplied in a recycle stream of the process such as the crystallization mother liquor and/or a fresh make-up stream. The process converts the aluminum values in aluminum-containing ore deposits to a form ($Al_2O_3$) useful in the production of aluminum metal.

8 Claims, 3 Drawing Figures

PRODUCTION OF ALUMINA FROM ORES

CROSS REFERENCE TO RELATED APPLICATIONS

See U.S. application Ser. No. 496,447, filed Aug. 12, 1974 in the names of T. K. Wiewiorowski and M. O. Nutt entitled "Removal of $P_2O_5$ From Aqueous Aluminum Fluoride Solutions."

BACKGROUND OF THE INVENTION

This invention relates to a process for converting the aluminum values found in aluminum-containing ores to alumina ($Al_2O_3$) which can then be used to produce aluminum metal. More particularly, the invention relates to a process for preparing alumina from aluminum-containing ores such as the aluminum-enriched clays indigenous to the United States. As is known, the major use of alumina is in the commercial production of aluminum metal. There are many known processes for converting the alumina to aluminum, although the well-known electrolysis process is probably the process most widely used commercially.

Commercial aluminum production normally consists of two major operations — the production of pure alumina and the reduction of this alumina to aluminum metal in the Hall-Heroult cells of the electrolysis process. Although aluminum occurs in many minerals, virtually the only source of alumina which has been used for commercial aluminum production is bauxite, a naturally occurring material comprising mainly hydrated oxides of alumina. Since about 1920, the United States has become progressively more dependent upon foreign sources for its supply of this strategic raw material. By 1970, less than one-eight of the bauxite consumed in the United States was of domestic origin, with most of the bauxite being imported from Jamaica. This situation was aggravated recently by steps taken by the Jamaican government which are expected to drastically raise the cost of imported Jamaican bauxite.

The most widely used method for the production of alumina from bauxite has been the so-called "Bayer Process" which is described in detail in the Bureau of Mines Report of Investigations No. 6730 published in 1960 and entitled "A Cost Estimate Of The Bayer Process For Producing Alumina". In addition to requiring bauxite as its starting material, the Bayer Process requires an undesirable, energy consuming bauxite leaching step involving elevated temperatures and pressures on the order of about 400° F. and 200 p.s.i, respectively.

The domestic reserves of bauxite, mainly in Arkansas deposits, are considered inadequate as a long range supply of aluminum. However, the potential domestic supply in low-grade, non-bauxite alumina deposits such as clays and the like is practically unlimited and, as might be expected, much work has been undertaken to develop commercial processes for extracting alumina from these low-grade domestic materials. Since domestic clays provide an abundant source of aluminum in the form of hydrous aluminum silicates, much of the effort has been focused in this area.

Among the proposed processes for obtaining aluminum from domestic ores such as clays are those in which the clays are leached with various inorganic acids such as $HNO_3$, $HCl$, $H_2SO_4$ and mixtures of $H_2SO_4$ and $H_2SO_3$ to extract the aluminum from the clay and ultimately produce alumina which can then be converted to aluminum. In such processes, the clay must ordinarily be calcined or dehydrated to remove water and convert the hydrous aluminum silicates to amorphous oxides of aluminum and silicon, thereby making the aluminum values leachable by the acids. Moreover, certain of the processes require prolonged leaching of the clay at high temperatures and pressures. Various acid-clay leaching processes are described in detail in Bureau of Mines Report of Investigations Nos. 6431 ($HNO_3$), 6229 ($H_2SO_4$), 6133 ($HCl$) and 7758 ($H_2SO_4$ — $H_2SO_3$). None of the acid leaching processes just mentioned compare favorably with the Bayer Process from an economic viewpoint and for this reason have not been widely adopted commercially.

It is also known that aluminum fluoride ($AlF_3$) for use in the production of aluminum can be prepared by treating clays, which preferably have been calcined, with fluorine containing acids such as HF or $H_2SiF_6$. See, for example, U.S. Pat. Nos. 508,796 and 1,403,183 and British Pat. Nos. 15,083 and 643,379. The $AlF_3$ is recovered from the reaction mixtures as crystals of hydrated $AlF_3$ which are then heated to remove water and produce the $AlF_3$ product.

Major drawbacks of prior art processes for producing alumina such as the Bayer process and certain of the acid-clay processes are that they require either an undesirable calcining of the aluminum raw material and/or a high temperature, high-pressure leaching of the aluminum raw material. Other drawbacks involve the need for relatively costly raw materials and, in the case of the Bayer process, the inability to use non-bauxite ore sources. The Bayer process also produces large quantities of useless solid wastes known in the bauxite industry as "red mud". Disposal of this "red mud" presents serious problems.

It is an object of this invention to provide an acid process for preparing alumina from aluminum-containing ores, such as the various aluminum-enriched domestic clays, which offers potential economic advantages over other known processes for producing alumina such as the Bayer Process and the various acid-clay leaching processes.

These and other objects of the invention will be apparent to those skilled in the art from a consideration of the specification and attached drawings taken in their entirety.

SUMMARY OF THE INVENTION

The above objectives are accomplished, in accordance with the present invention, by reacting an aluminum-containing ore, such as the various aluminum-enriched clays indigenous to the United States, with an inorganic fluorine acid such as hydrofluoric acid (HF), fluosilicic acid ($H_2SiF_6$), or mixtures thereof, at low temperatures and pressures. During the reaction, the aluminum content of the ore is solubilized to produce an aqueous solution of aluminum fluoride ($AlF_3$) and a residue of solids. The $AlF_3$ dissolved in the liquid phase of the reaction mixture is then recovered by subjecting the separated liquid phase to crystallization to produce $AlF_3 \cdot 3H_2O$ crystals which are then dried and dehydrated to yield $AlF_3$. The crystallization mother liquid is recycled to the process to recover its $AlF_3$ values. The $AlF_3 \cdot 3H_2O$ crystals and the separated solids residue from the reaction mixture are washed to recover their $AlF_3$ values and the wash water then recycled to the process. The recovered $AlF_3$ is then pyrolyzed in the presence of water to produce $Al_2O_3$ and HF. The HF produced in the pyrohydrolysis step is recycled to the ore treating step by absorbing it in one of the recycled aqueous streams of the process such as the mother liquor from the crystallization step. The unique recycling of $AlF_3$ enriched liquid streams and the recovery and recycle of $AlF_3$ values contained in various solids streams produced in the process permits recoveries of 90% or more of the aluminum content of the ore in the form of high purity alumina. This, coupled with the mild leaching conditions used, the recycling of the fluorine acid, and the fact that uncalcined ores can be employed, results in a process for producing alumina from domestic aluminum reserves which offers potential economic advantages over processes heretofore described.

A convenient source of the fluorine-containing acid used in the process is the by-products of a wet process phosphoric acid facility. As is known, these facilities generate large amounts of gases such as HF and silicon tetrafluoride ($SiF_4$) in the digestors and concentrators of the process, as well as liquid streams of HF and $H_2SiF_6$ which result from absorbing the HF and $SiF_4$ gases in water. The HF and $SiF_4$, like the HF from the pyrohydrolysis step, can also be absorbed in an aqueous recycle stream to form $H_2SiF_6$ which is then returned to the ore treating step. Of course, any source of the required HF and $H_2SiF_6$ can be used in the practice of the invention. However, a wet process phosphoric acid facility is normally a plentiful and inexpensive source of these materials, a factor which makes the process of this invention particularly adaptable for integration with a wet process phosphoric acid facility.

The invention is explained in greater detail below in conjunction with the ensuing description of its more specific embodiments, and the accompanying drawings illustrating these embodiments.

DESCRIPTION OF THE PREFERRED EMBODIMENTS

Figure 1:
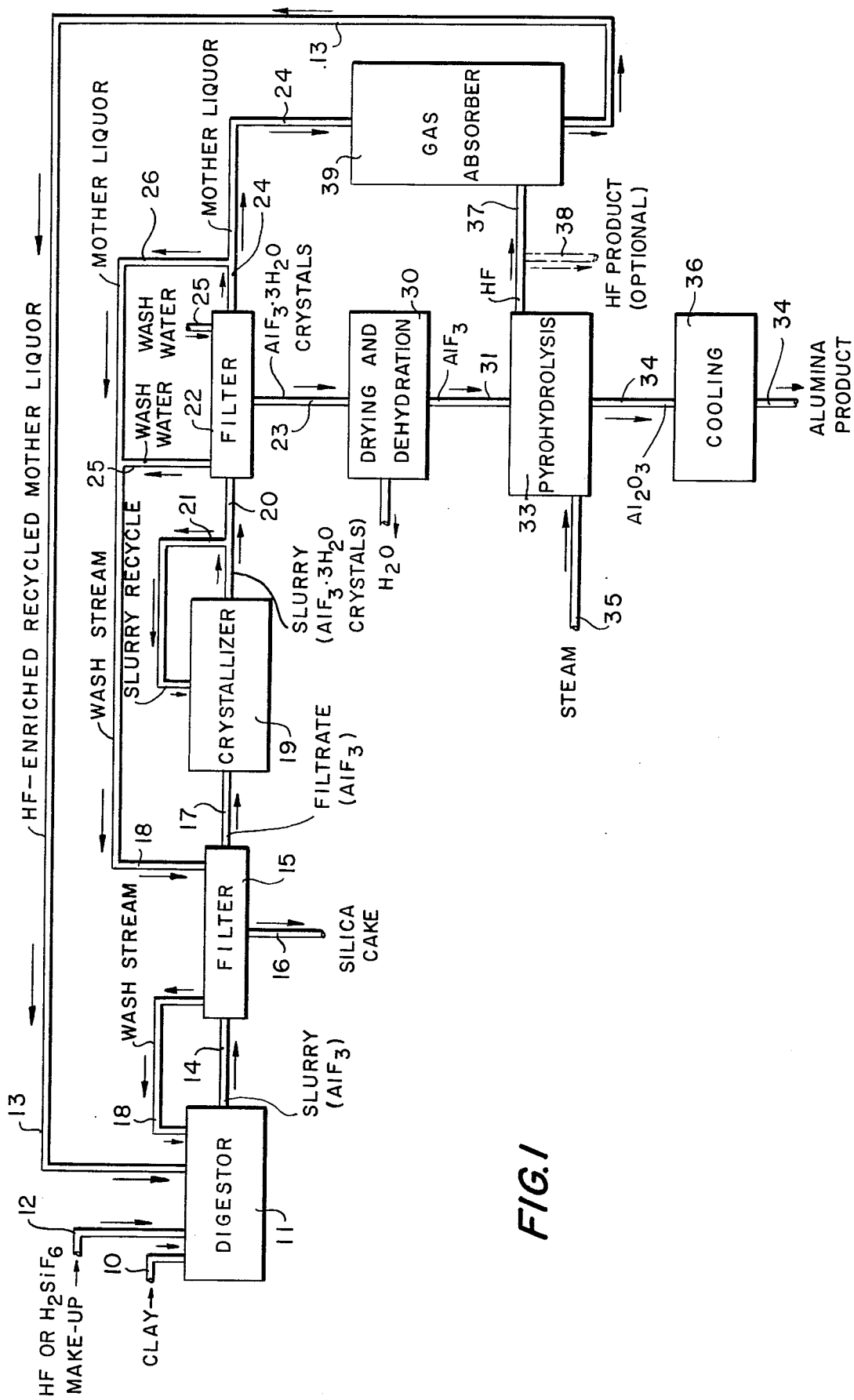
FIGS. 1-3 are schematic flowsheets of three preferred embodiments of the process of the invention, the main difference between the three residing in how the recycle stream 13 of fluorine-containing acid is prepared.
Figure 2:
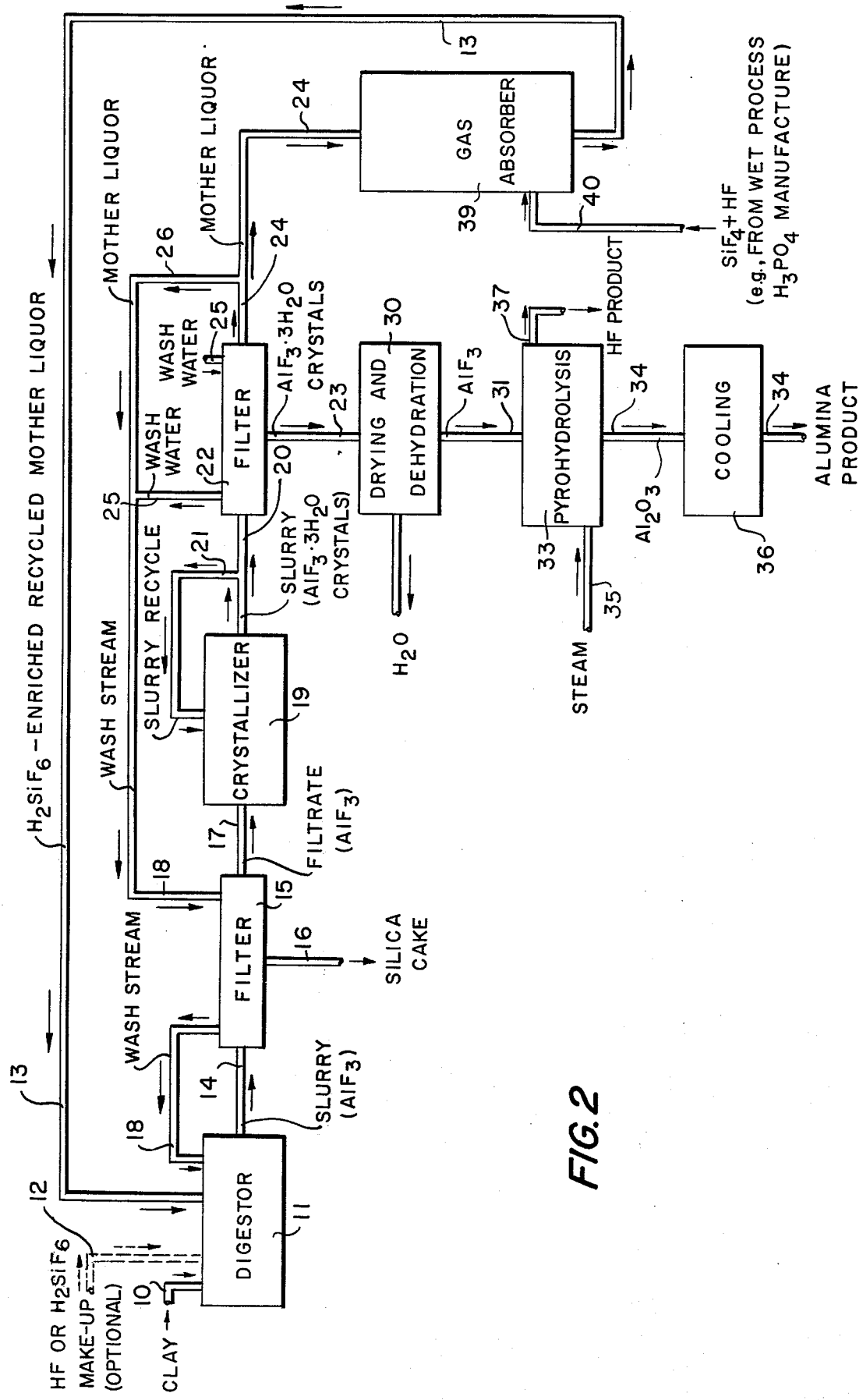
Figure 3:
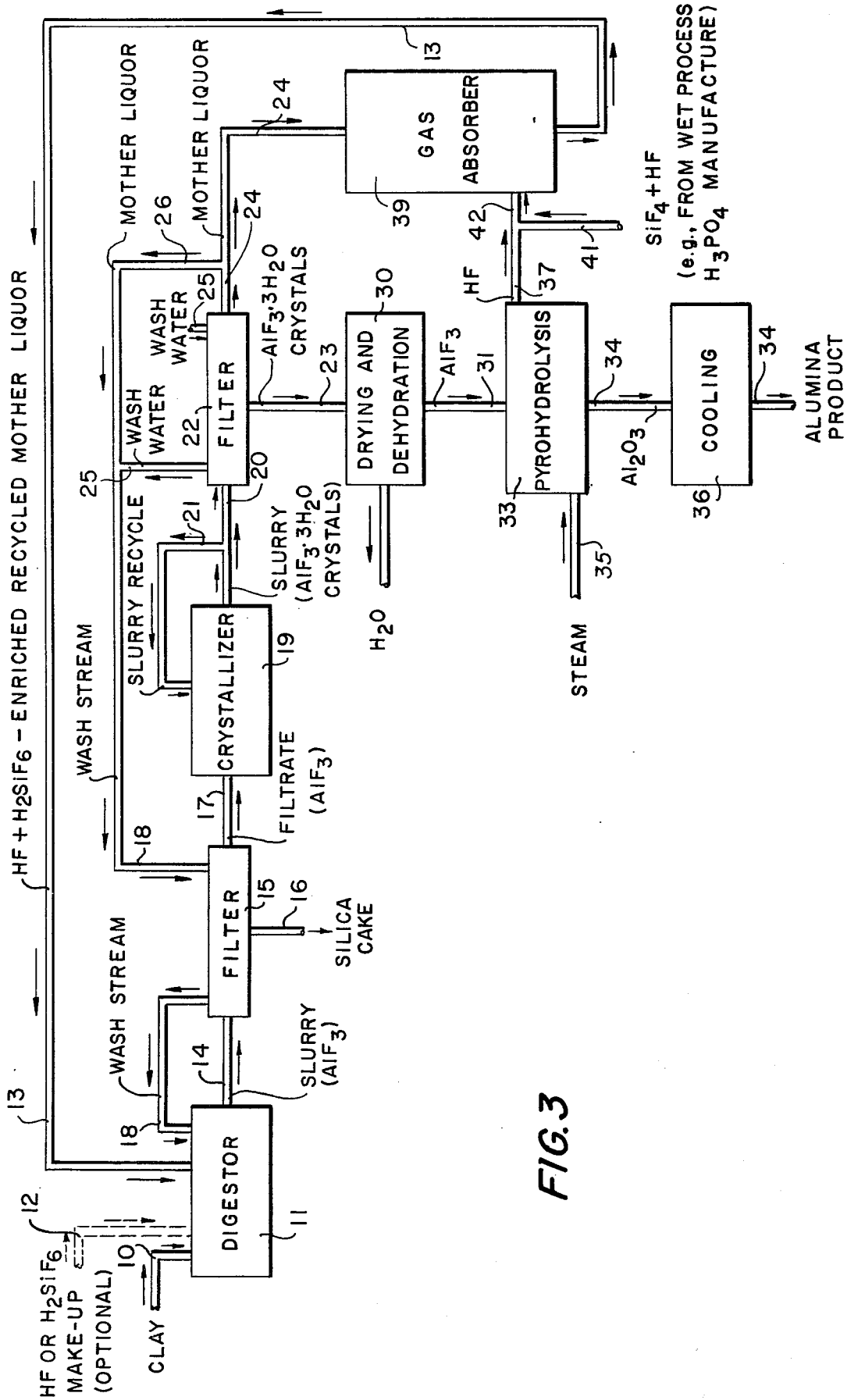

Referring to FIGS. 1-3, an aluminum-containing ore such as a domestic clay 10 is fed to a digestor 11 along with make-up HF or $H_2SiF_6$ 12 and a process recycle stream 13 enriched in HF where they react to form a slurry 14 whose liquid phase contains the dissolved $AlF_3$ reaction product and whose solid phase is largely silica originating from the clay and $H_2SiF_6$.

The ore used can be any aluminum containing ore in which the aluminum is present in a chemical form capable of producing $AlF_3$ when the ore is treated with HF or $H_2SiF_6$. Generally, any ore in which the aluminum is originally present as hydrous aluminum silicates lends itself to the successful practice of this invention. Illustrative aluminum ores include the aluminum enriched siliceous clays such as the various kaolin and montmorillonite type clays found in the United States and elsewhere. The clays useful in the practice of the invention usually contain large amounts of alumina and silica and a number of these clays are described in the Kirk-Othmer Encyclopedia of Chemical Technology, 2nd edition, Vol. 5, pp. 541–585, Interscience (1964) and in the Bureau of Mines Reports of Investigations referred to above, said publications incorporated herein by reference.

Kaolin clays usually have as their chief constituents the so-called kaolin minerals which include kaolinite, dickite, nacrite, anauxite, halloysite, endellite and the like, with the kaolinite usually being the major component of the clay. Kaolin clays can be generally represented by the formula of kaolinite, $Al_2O_3 \cdot 2SiO_2 \cdot 2H_2O$. Montmorillonite clays normally have as their chief constituents the so-called montmorillonite minerals which include montmorillonite, beidellite, nontronite, hectorite, saponite, sauconite, volkhonskoite and the like, with the montmorillonite usually being the major component of the clay. Montmorillonite clays normally contain exchangeable cations such as magnesium calcium, sodium and potassium, and can be generally represented by the formula of montmorillonite, $(Mg \cdot Ca)O \cdot Al_2O_3 \cdot 4SiO_2 \cdot nH_2O$ in which the $n$ denotes a variable number of water molecules. Two well known examples of montmorillonite clays are Fuller's earth and bentonite.

It is to be understood that the aluminum-containing clays useful in this invention can be, and have been, represented by those skilled in the art by many different chemical formulae and that the specific chemical formulae for the clays used herein are for purposes of illustration only. For example, clays in general are often represented by those skilled in the art by the formula for kaolinite, $Al_2O_3 \cdot 2SiO_2 \cdot 2H_2O$. It is to be further understood that other aluminum-containing ores, whether normally categorized as clays or not, are also embraced within the scope of the invention.

The clay 10 is preferably a raw uncalcined clay which has not been subjected to any crushing or other treatments to reduce its particle size. In the uncalcined clay, the aluminum is present as one or more hydrous aluminum silicates. Calcining is a relatively expensive step and its elimination without adversely affecting the efficiency of the process is an advantage of the process of the invention. Calcined clay and refined or upgraded clays can also be successfully employed in the practice of the invention. If the clay is calcined, the aluminum is no longer present as hydrous aluminum silicates but instead is converted to amorphous oxides of aluminum. Domestic kaolin clay of the type generally available in certain southeastern regions of the United States is a preferred source of the aluminum for the process. For the case where the clay is an uncalcined kaolin clay, the reaction taking place in the digestor 11 can be generally represented by the equations:

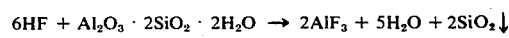

$$6HF + Al_2O_3 \cdot 2SiO_2 \cdot 2H_2O \rightarrow 2AlF_3 + 5H_2O + 2SiO_2\downarrow$$

$$H_2SiF_6 + Al_2O_3 \cdot 2SiO_2 \cdot 2H_2O \rightarrow 2AlF_3 + 3H_2O + 3SiO_2\downarrow$$

The HF or $H_2SiF_6$ reactant can be obtained from any suitable source such as a wet process phosphoric acid facility. The HF fed to the digestor, whether fresh or recycled, illustratively contains about 10 to 80% by weight, and preferably about 20 to 50%, HF. The $H_2SiF_6$ fed to the digestor, whether fresh or recycled, illustratively contains about 10 to 40% by weight, and preferably about 15 to 30%, $H_2SiF_6$.

The reaction between the clay and acid is illustratively carried out at temperatures between about 122° F. and the boiling point of the reaction mixture, which is normally about 212° F. or somewhat higher. Extraction of the alumina values from the clay diminishes appreciably as temperatures fall below about 122° F. The reaction itself is exothermic so that normally little external heating is required to maintain the desired reaction temperatures. Preferred reaction temperatures are about 180° to 210° F.

Pressure is not critical to the leaching reaction and it proceeds quite satisfactorily at atmospheric pressure. Of course, lower or higher pressures could be used if desired. If higher pressures are used, the boiling point of the solution would increase, permitting the use of higher temperatures in the leaching step if desired.

The time required for the leaching reaction can vary considerably depending upon such factors as the reaction temperature and the desired extraction efficiency. Generally at higher temperatures, less time is required than at lower temperature for comparable extraction efficiencies. For example, at 140° F., approximately 20 minutes normally suffices while at 203° F., only about five minutes are required. In general, anywhere from about 5 to 30 minutes is sufficient to produce a satisfactory extraction, depending largely upon the temperature at which the extraction is carried out.

The reaction of clay and acid can employ the stoichiometric amount of reactants, but a stoichiometric amount is not always necessary. Preferably, a slight stoichiometric excess, e.g., 1 to 10%, of the fluorine-containing acid is used.

Extraction efficiencies better than 90% (based on aluminum) have been obtained with HF and/or $H_2SiF_6$. Illustratively, aluminum extraction efficiencies of about 80-98% are obtainable.

The fluorine-containing acid fed to the reactor is preferably HF, $H_2SiF_6$ or a mixture of these acids. The required acid may be provided solely by a fresh make-up stream, or all or part of it may be supplied by a recycle stream of the process with fresh make-up acid added only as needed. The fluorine-containing acid may be a by-product of a wet process phosphoric acid facility, although acid from any source is suitable.

The slurry 14 containing the $AlF_3$ produce dissolved in its liquid phase is then sent to a filter 15 where the silica solids 16 are separated from the liquid phase to produce a clear filtrate 17 containing the $AlF_3$. The filtration can be carried out using any conventional rapid solids-liquid separation techniques known to those skilled in the art, such as centrifuging, pressure filtering, vacuum filtering, or the like. The filter cake 16 is preferably washed with a recycle stream 18 to remove $AlF_3$ retained in the cake, after which the wash stream 18 is recycled to the digestor 11 for eventual recovery of the reclaimed $AlF_3$. The recovered silica solids 16 exhibit useful properties which make them suitable for use in applications presently served by clays, e.g., as paper coatings, thereby providing a potentially sealable by-product of the process.

The $AlF_3$ enriched filtrate 17 is then sent to a crystallizer 19 to recover the $AlF_3$ as crystals of hydrated $AlF_3$ having the formula $AlF_3 \cdot 3H_2O$. The crystallization is carried out in accordance with crystallization procedures and equipment known to those skilled in the art. Illustratively, the crystallization is conducted at substantially atmospheric pressure and temperatures of about 140° to 212° F., with retention tmes of about 2 to 6 hours. The crystallization produces a slurry 20 made up of $AlF_3 \cdot 3H_2O$ crystals and a crystallization mother liquor containing dissolved $AlF_3$. Since the crystallization is normally only about 70 to 90% efficient, considerable quantities of valuable $AlF_3$ product are normally retained in the mother liquor. A small portion 21 of slurry 20, e.g., 5–10% or less, may optionally be recycled to crystallizer 19 to provide seed crystals of $AlF_3 \cdot 3H_2O$ to promote the crystallization process, thereby producing better product yields and crystals of larger average crystal sizes.

The crystallization slurry 20 is then sent to a filter 22 where the $AlF_3 \cdot 3H_2O$ crystals 23 are separated from their crystallization mother liquor 24. The crystals 23 are then preferably washed with a fresh stream of water 25 to recover the $AlF_3$ enriched mother liquor retained by the crystals. The wash water 25 is then preferably combined with a portion 26 of the crystallization mother liquor 24, e.g., about 40 to 60% of stream 24, to form a composite wash stream 18 which is then recycled to wash the silica cake 16, as previously discussed. Wash stream 18 is then returned to the digestor 11 for subsequent recovery of its $AlF_3$ content.

The recovered $AlF_3 \cdot 3H_2O$ crystals 23 are next sent to an oven, dryer, or other suitable apparatus 30 where they are subjected to temperatures high enough to dry the crystals, i.e., to remove unbound or free water, and dehydrate the crystals, i.e., to remove bound water such as the waters of hydration. Illustratively, temperatures of about 200° to 1400° F., and preferably about 800° to 1200° F., suffice to dry and dehydrate the $AlF_3 \cdot 3H_2O$ crystals to $AlF_3$ 31. The dehydration proceeds according to the equation:

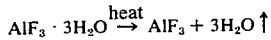
$$AlF_3 \cdot 3H_2O \xrightarrow{heat} AlF_3 + 3H_2O \uparrow$$

The drying and dehydration of the $AlF_3 \cdot 3H_2O$ crystals can be carried out in a single step or in two separate steps. When a single step operation is used, the $AlF_3 \cdot 3H_2O$ crystals are subjected to temperatures high enough to simultaneously dry and dehydrate the $AlF_3 \cdot 3H_2O$ crystals to the desired $AlF_3$ product. In the case where a two step operation is used, the $AlF_3 \cdot 2 \: 3H_2O$ crystals are subjected in one step to temperatures high enough to dry the $AlF_3 \cdot 3H_2O$ crystals, but not high enough to dehydrate the crystals to any substantial extent. Illustrative drying temperatures are about 200° to 300° F., with drying temperatures of about 200° to 220° F. preferred. In another separate step, the dried crystals are then subjected to temperatures high enough to dehydrate the dried crystals, these temperatures being higher than those normally required to dry the crystals. Illustrative dehydrating temperatures are about 400° to 1400° F., with dehydrating temperatures of about 800° to 1200° F. preferred.

The dried and dehydrated $AlF_3$ product 31 is next subjected to pyrolysis in the presence of water (pyrohydrolysis) using any suitable apparatus 33, to convert the $AlF_3$ to alumina 34 in accordance with the equation:

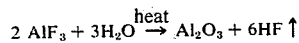
$$2 \: AlF_3 + 3H_2O \xrightarrow{heat} Al_2O_3 + 6HF \uparrow$$

The pyrohydrolysis is illustratively carried out at temperatures of about 1500° to 2500° F., with temperatures of about 1800° to 2500° F. preferred. Illustratively, the $AlF_3$ is contacted with very hot steam 35 which supplies the moisture and at least some of the heat required to carry out the pyrohydrolysis.

Alternatively, $AlF_3 \cdot 3H_2O$ crystals in either a dired or undried state can be directly subjected to temperatures high enough to carry out the pyrohydrolysis in order to utilize the water of crystallization, and any unbound water which may be associated with the crystals, as the source of the water in the pyrohydrolysis reaction, in accordance with the equations:

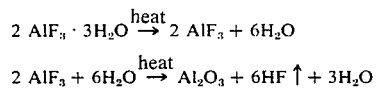

When this approach is employed, the $AlF_3 \cdot 3H_2O$ crystals are first dried, if originally in an undried state, and dehydrated as a result of the high temperatures required in the pyrohydrolysis to provide water which then chemically reacts with the $AlF_3$ in the pyrohydrolysis reaction to produce alumina and hydrofluoric acid.

The alumina product 34 is then cooled 36 and can be used in any of the various applications for alumina, including the production of aluminum metal. Using the process of the invention, it has been possible to recover at least about 80%, and usually 90% or more, of the aluminum content of the clay as $Al_2O_3$.

The pyrohydrolysis step 33 also generates HF vapors 37. All or a part 38 of this HF can be optionally withdrawn from the process for sale, production of aqueous HF, or other purposes. Alternatively, all or part of the HF 37 can be sent to a gas absorber or scrubber 39 where it contacts the portion of the crystallization mother liquor 24 which was not recycled to wash the silica cake 16, to form an HF enriched mother liquor 13 which is then recycled to the digestor 11 to supply the acid required in the process.

Some fluorine losses do occur in the process and ordinarily the HF enriched recycle stream 13 does not provide all of the fluorine-containing acid required in the process. In this event, enough fresh make-up acid 12 is supplied to digestor 11 to compensate for the deficiency. The extent of the deficiency will depend upon the amount of HF 38 withdrawn from the process. The more HF withdrawn, the more HF or $H_2SiF_6$ that must be supplied by the make-up stream 12. In the event that all the HF is withdrawn at 38, virtually no HF would be present in the stream 13 recycled to the digestor, in which case practically the entire fluorine-containing acid requirement of the process would be supplied by make-up stream 12. Even if none of the HF 37 is recycled to the process, the crystallization mother liquor would normally still be recycled to the digestor 11 to recover its $AlF_3$ content.

When HF is to be recycled, the crystallization mother liquor 24 provides a convenient stream in which to absorb the HF for recycle. But it will be understood that the HF 37 need not be absorbed in stream 13 and instead could be absorbed in any suitable available recycle stream or returned as make-up stream 12. As heretofore pointed out, the origin of the HF or $H_2SiF_6$ in make-up stream 12 is unimportant. It can be the HF generated in the pyrohydrolysis step; it could be purchased HF of $H_2SiF_6$; it could be HF or $H_2SiF_6$ from a wet phosphoric acid facility or acid prepared from HF vapors or mixtures of HF and $SiF_4$ vapors regardless of the origins of the vapors. Preferably, however, the HF 37 generated in the pyrohydrolysis step is absorbed in the crystallization mother liquor 24 to form an HF enriched mother liquor 13 which is then recycled to digestor 11 as shown in FIG. 1, with any deficiency of HF or $H_2SiF_6$ supplied fresh make-up acid 12.

FIG. 2 illustrates an embodiment of the invention wherein all the HF 37 produced in the pyrohydrolysis step is withdrawn from the process. The crystallization mother liquor 13 is still recycled to the process but this time is enriched in $H_2SiF_6$ instead of HF as the result of absorbing a mixture of $SiF_4$ and HF vapors 40 in the recycled mother liquor where they react to form $H_2SiF_6$. As is known, vapor mixtures of $SiF_4$ and HF are produced in large quantities in wet process phosphoric acid facilities, usually in the digestors and evaporators of the wet process. These vapors are normally absorbed in various scrubbers and condensers in the wet process but could just as readily be absorbed in the mother liquor 24 of the present invention. For the case where abundant amounts of the $SiF_4$ — HF vapor mixture were available from a wet process facility or elsewhere, no make-up 12 would ordinarily be required, since all the acid requirements of the digestor 11 could be satisfied by recycle stream 13. When the available amount of $SiF_4$ — HF vapor does not, for any reason, suffice to meet the acid requirements of the digestor, fresh make-up HF or $H_2SiF_6$ 12 is added to supply the deficiency.

If the mixture 40 of $SiF_4$ and HF fed to the gas absorber 39 contains the proper stoichiometric proportions of each to form $H_2SiF_6$, the recycled stream 13 is essentially a $H_2SiF_6$ enriched stream. However, if stream 40 contained a stoichiometric excess of HF, recycled stream 13 would be enriched with a mixture of HF and $H_2SiF_6$, with the proportion of HF to $H_2SiF_6$ depending on how much excess HF was present in stream 40.

FIG. 3 illustrates an embodiment of the invention wherein the HF 37 produced in the pyrohydrolysis step is recycled to the process by absorbing it in the crystallization mother liquor 24 (as in FIG. 1) but wherein a mixture of $SiF_4$ and HF vapors 41 is first blended with the HF 37 from the pyrohydrolysis to produce a stream 42 comprising a mixture of HF and $SiF_4$ which is then absorbed in the mother liquor 24. The $SiF_4$ and at least some of the HF react in the mother liquor to form $H_2SiF_6$ so that the recycled mother liquor 13 is enriched in $H_2SiF_6$ and in any HF which did not react with the $SiF_4$ to form $H_2SiF_6$. The $SiF_4$ and HF stream 41 can also be fed to the gas absorber 39 separately from the HF stream 37.

The stream of $SiF_4$ and HF 41 can originate from any source such as, for example, a wet process phosphoric acid facility wherein plentiful amounts of mixtures of $SiF_4$ and HF vapors are normally found. Preferably enough fluorine is supplied by the $SiF_4$ and HF stream 41 to compensate for losses of fluorine in the process so that a separate make-up stream 12 of fresh HF or $H_2SiF_6$ is not required. However, in the case where, for any reason, the available $SiF_4$ and HF did not suffice to provide the required amount of fluorine-containing acid, the deficiency is supplied by fresh make-up HF or $H_2SiF_6$ from any source.

The following examples are provided to further illustrate the invention. In these examples, all parts are by weight unless otherwise indicated.

EXAMPLE 1

In this example, $Al_2O_3$ was prepared generally in accordance with the process shown in FIG. 1 of the drawings.

3459 parts of domestic kaolin clay 10 (see FIG. 1) containing 32% $Al_2O_3$ were treated with 410 parts of fresh 20% $H_2SiF_6$ make-up 12 and 3909 parts of recycled HF liquor 13 containing 30% HF, in accordance with the flow scheme of FIG. 1. The clay was leached with the mixture of $H_2SiF_6$ and HF for about 20 minutes with agitation at atmospheric pressure and a temperature of about 193° F. The resulting slurry 14 was filtered to yield 3450 parts of wet silica cake 16 containing 3.2% $Al_2O_3$, and 8543 parts of filtrate 17 containing 21% $AlF_3$. The filtrate analysis indicated that about 98% of the aluminum content of the clay had been extracted as $AlF_3$ during the digestion and leaching. The filtrate was subjected to crystallization at about 212° F. and atmospheric pressure for four hours to yield a slurry 20 containing aluminum fluoride trihydrate ($AlF_3 \cdot 3H_2O$) crystals. The slurry was subjected to filtration to separate the crystals from the mother liquor 24. The $AlF_3 \cdot 3H_2O$ cake was washed with 1903 parts of $H_2O$ 25 and the wash water from this operation was combined with part 26 of the separated crystallization mother liquor 24 to furnish a liquor 18 which was used as a solution for washing the silica cake 16. This wash solution 18 was ultimately returned to the digestor 11 after passage through the silica cake 16. The separated $AlF_3 \cdot 3H_2O$ crystals 23 were subjected to drying and dehydration by heating them to a temperature of 1200° F. The hot $AlF_3$ was then subjected to pyrohydrolysis at 1800° F. in the presence of sufficient water vapor 35 to carry out the hydrolysis. The pyrohydrolysis converted virtually all the $AlF_3$ to alumina 34. The HF 37 released during the pyrohydrolysis was recovered by absorption in the crystallization mother liquor 24 and recycled to the digestor 13 where it provided a portion of the acid requirement of the process. The alumina 34 was cooled to yield 1000 parts of product. This was equivalent to a yield based upon the aluminum content of the clay of about 90%. The analyses of pertinent streams referred to in this example, in parts by weight, are given in Table 1 below:

from their crystallization mother liquor and dried at 220° F. and dehydrated at 800° F. to yield $AlF_3$ which was then heated at 1800° F. in the presence of sufficient steam to convert practically all the $AlF_3$ to $Al_2O_3$. The HF liberated during the pyrohydrolysis was recovered. About 28.8 parts of alumina product of better than 99% purity was produced, having the following analysis:

|  | parts | % by weight |
|---|---|---|
| $Al_2O_3$ | 28.8 | 99.6 |
| $SiO_2$ | nil | — |
| $Fe_2O_3$ | 0.01 | 0.04 |
| $TiO_2$ | nil | — |
| $H_2O$ | nil | — |
| F | nil | — |

This corresponded to a product yield based upon the aluminum content of the clay of about 84%.

The specific and detailed information presented in the above examples and elsewhere herein is by way of illustration only, and such alterations and modifications thereof as would be apparent to those skilled in the art are deemed to fall within the scope and spirit of the invention, bearing in mind that the invention is defined only by the following claims.

What is claimed is:
1. A process which comprises:
   a. reacting an aluminum-containing ore with hydrofluoric acid, fluosilicic acid or a mixture of hydrofluoric and fluosilicic acid, at a 0 to about 10% stoichiometric excess of acid and at a temperature of about 122° to about 212°F, to form a slurry containing aluminum fluoride in its liquid phase;
   b. separating the liquid phase containing the alumi-

TABLE 1

| Components | Clay (10) | $H_2SiF_6$ make-up (12) | silica cake (16) | $AlF_3$ Filtrate (17) | Alumina Product (34) | Wash stream (18) | HF-enriched Recycled Mother Liquor (13) |
|---|---|---|---|---|---|---|---|
| $H_2SiF_6$ | — | 82 | — | — | — | nil | 1176 |
| HF | — | — | — | — | — | — | — |
| $Al_2O_3$ | 1111 | — | 111 | — | 1000 | 96 | 83 |
| $AlF_3$ | — | — | — | 1794 | — | — | — |
| F | — | — | 68 | — | nil | — | — |
| $SiO_2$ | 1307 | — | 1341 | nil | nil | nil | nil |
| $Fe_2O_3$ | 4 | — | 4 | 2 | nil | nil | nil |
| $TiO_2$ | 29 | — | 29 | nil | nil | nil | nil |
| $H_2O$ | 1008 | 328 | 1900 | 6747 | nil | 4680 | 2650 |
| Total: | 3459 | 410 | 3452 | 8543 | 1000 | 4776 | 3909 |

EXAMPLE 2

100 parts of domestic uncalcined kaolic clay containing 18.2% aluminum were treated with about 237 parts of 21% by-product $H_2SiF_6$ obtained from the manufacture of wet process phosphoric acid. The resulting slurry was agitated vigorously for 20 minutes at atmospheric pressure and a temperature of about 193° F. The solids were then separated from the slurry by centrifugation and washed with 100 parts of $H_2O$, dried and weighed. Analysis of the separated solids showed a weight loss of about 40% and an aluminum content of 3.1%, corresponding to a 90% extraction of aluminum from the clay. The filtrate containing dissolved $AlF_3$ was placed in a heated vessel and held at 203° F. for four hours to promote the crystallization of $AlF_3 \cdot 3H_2O$. The $AlF_3 \cdot 3H_2O$ crystals were then separated num fluoride from the solid phase of the slurry;
c. subjecting the separated liquid phase to crystallization to produce crystals of hydrated aluminum fluoride;
d. separating the crystals from the crystallization mother liquor;
e. drying and dehydrating the separate crystals, at a temperature of about 200°F to about 1400°F, to produce aluminum fluoride;
f. pyrohydrolyzing the aluminum fluoride, at a temperature of about 1500°F to about 2500°F, to produce alumina and hydrofluoric acid;
g. absorbing the hydrofluoric acid produced in step (f) in a first portion of the separated crystallization mother liquor, and recycling the fluorine enriched mother liquor to step (a) of the process;

h. washing the separated crystals produced in step (d) and the separated solid phase of the slurry produced in step (b) with water, and recycling the water to step (a) of the process; and i. washing the separated solid phase of the slurry produced in step (b) with a second portion of the separated crystallization mother liquor, and recycling the mother liquor to step (a) of the process.

2. The process of claim 1 wherein step (a) is carried out at about 180° to 210°F.

3. The process of claim 1 wherein step (e) is carried out at about 800° to 1200°F.

4. The process of claim 1 wherein step (f) is carried out at about 1800° to 2500°F.

5. The process of claim 1 wherein step (c) is carried out at about 140° to 212°F.

6. A process which comprises:
   a. reacting an aluminum-containing clay with hydrofluoric acid, fluosilicic acid or a mixture of hydrofluoric and fluosilicic acid, at a 0 to about 10% stoichiometric excess of acid and at a temperature of about 122°F to about 212°F, to form a slurry containing aluminum fluoride in its liquid phase;
   b. separating the liquid phase containing the aluminum fluoride from the solid phase of the slurry;
   c. subjecting the separated liquid phase to crystallization to produce crystals of hydrated aluminum fluoride;
   d. separating the crystals from the crystallization mother liquor;
   e. drying and dehydrating the separated crystals, at a temperature of about 200°F to about 1400°F, to produce aluminum fluoride;
   f. pyrohydrolyzing the aluminum fluoride, at a temperature of about 1500°F to about 2500°F, to produce alumina and hydrofluoric acid;
   g. absorbing the hydrofluoric acid produced in step (f) in a first portion of the separated crystallization mother liquor, and recycling the fluorine-enriched mother liquor to step (a) of the process;
   h. washing the separated crystals produced in step (d) and the separated solid phase of the slurry produced in step (b) with water, and recycling the water to step (a) of the process; and
   i. washing the separated solid phase of the slurry produced in step (b) with a second portion of the separated crystallization mother liquor, and recycling the mother liquor to step (a) of the process.

7. The process of claim 6 wherein the aluminum-containing clay is a kaolin or montmorillonite clay.

8. A process which comprises:
   a. reacting uncalcined kaolin or montmorillonite clay with hydrofluoric acid, fluosilicic acid or a mixture of hydrofluoric and fluosilicic acid, at a 0 to about 10% stoichiometric excess acid and at a temperature of about 122°F to about 212°F, to form a slurry containing aluminum fluoride in its liquid phase;
   b. separating the liquid phase containing the aluminum fluoride from the solid phase of the slurry;
   c. subjecting the separated liquid phase to crystallization to produce crystals of hydrated aluminum fluoride;
   d. recycling a portion of the crystals to step (c) of the process;
   e. separating the remaining crystals from the crystallization mother liquor;
   f. drying and dehydrating the separated crystals, at a temperature of about 200°F to about 1400°F, to produce aluminum fluoride;
   g. pyrohydrolyzing the aluminum fluoride, at a temperature of about 1500°F to about 2500°F, to produce alumina and hydrofluoric acid;
   h. absorbing the hydrofluoric acid produced in step (g) in a first portion of the separated crystallization mother liquor, and recycling the fluorine-enriched mother liquor to step (a) of the process;
   i. washing the separated crystals produced in step (e) with water;
   j. combining the wash stream produced in step (i) with a second portion of the separated crystallization mother liquor to form a composite wash stream, washing the separated solid phase of the slurry produced in step (b) with the composite wash stream, and then recycling the composite wash stream to step (a) of the process.

* * * * *